Figure 4:
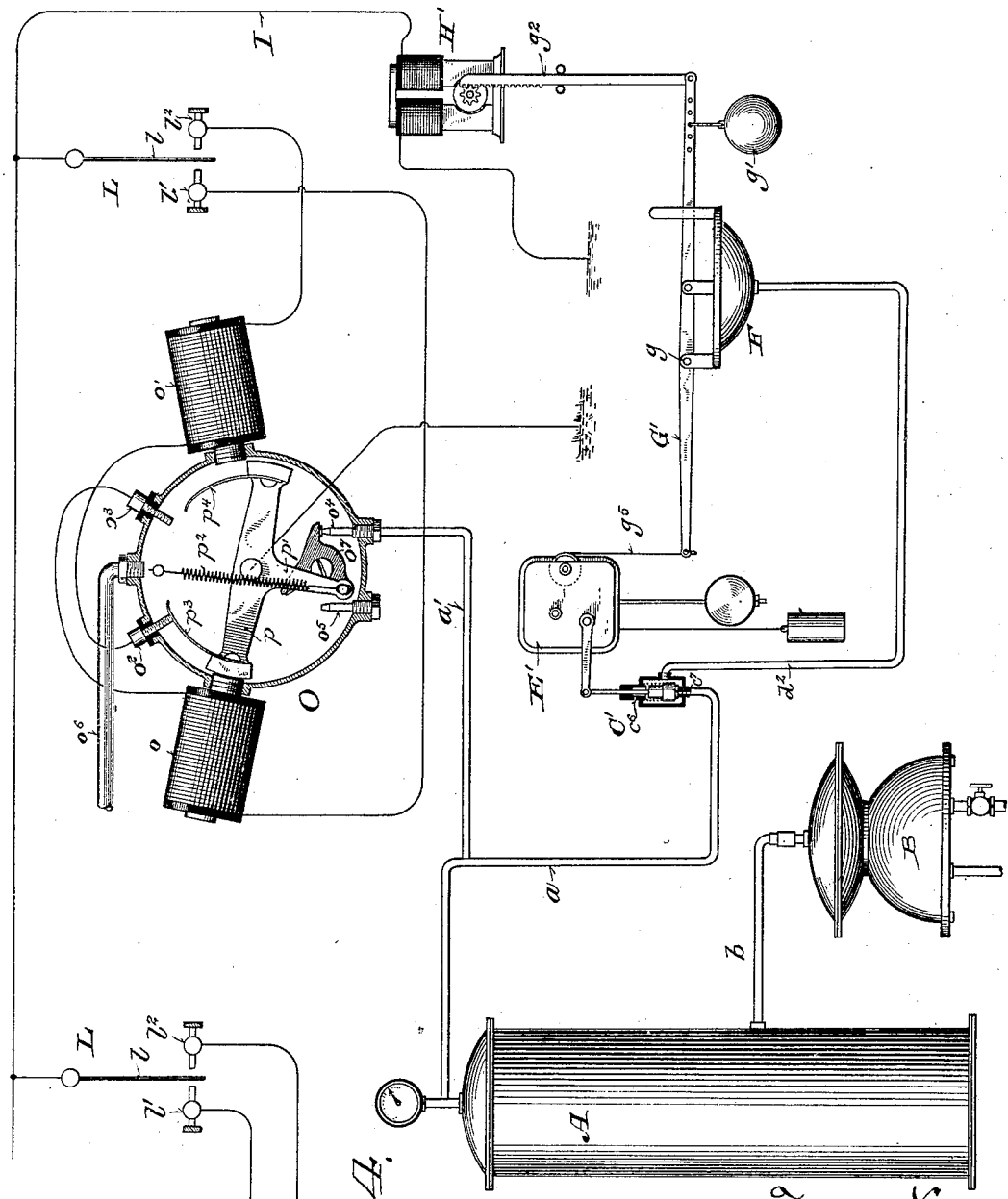

(No Model.) 4 Sheets—Sheet 1.
C. L. FORTIER.
AUTOMATIC TEMPERATURE REGULATING APPARATUS.
No. 551,951. Patented Dec. 24, 1895.
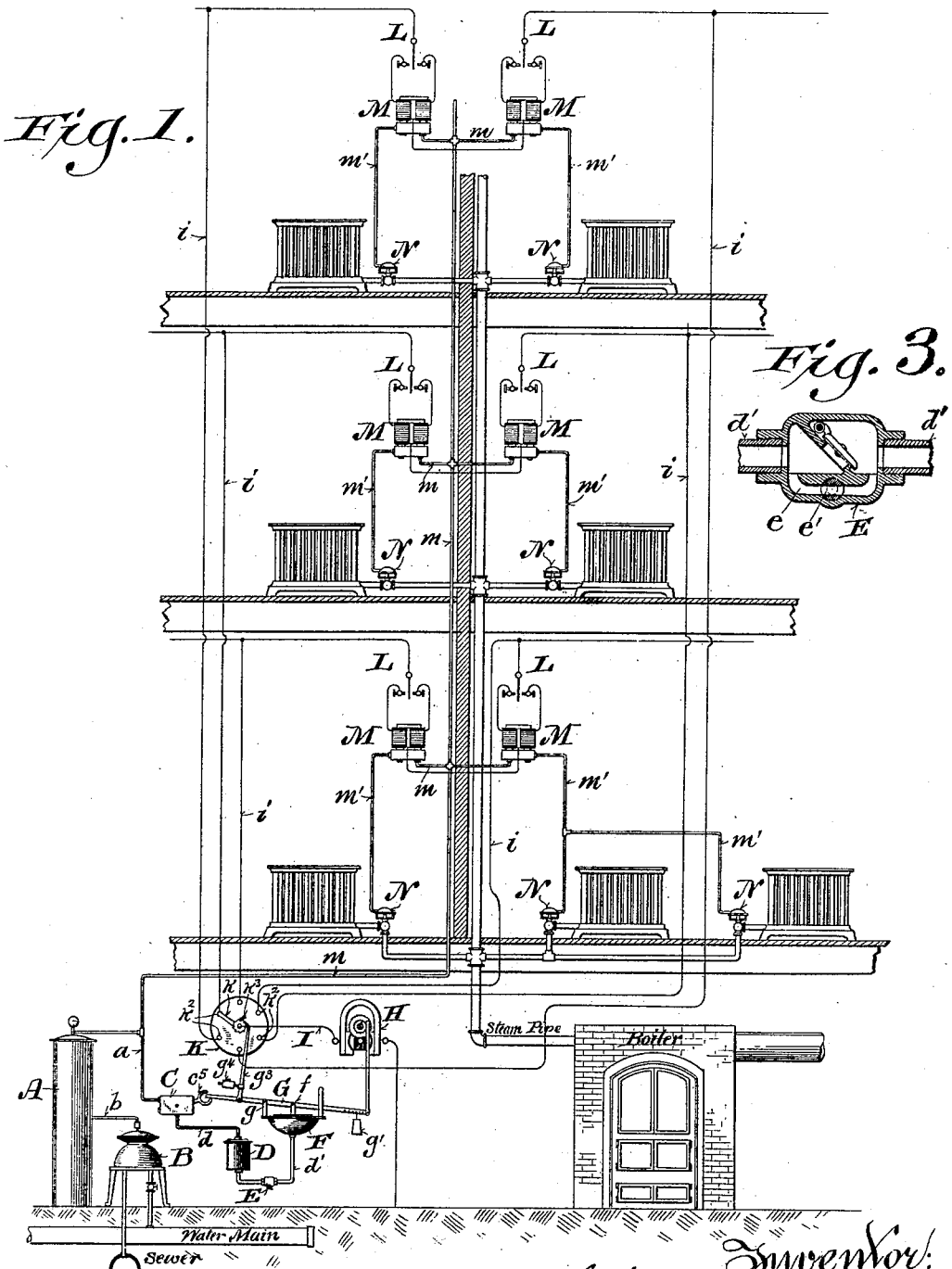

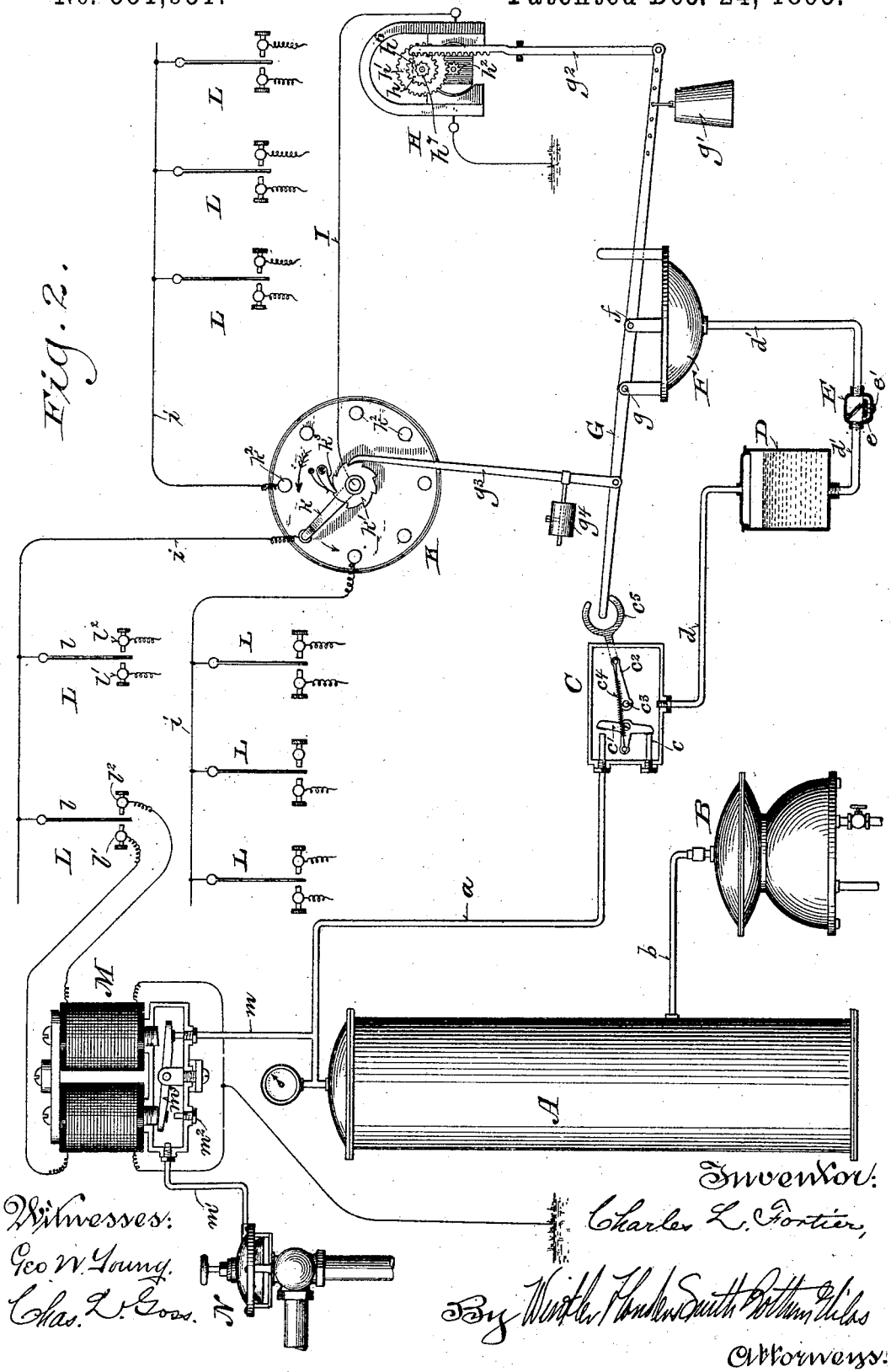

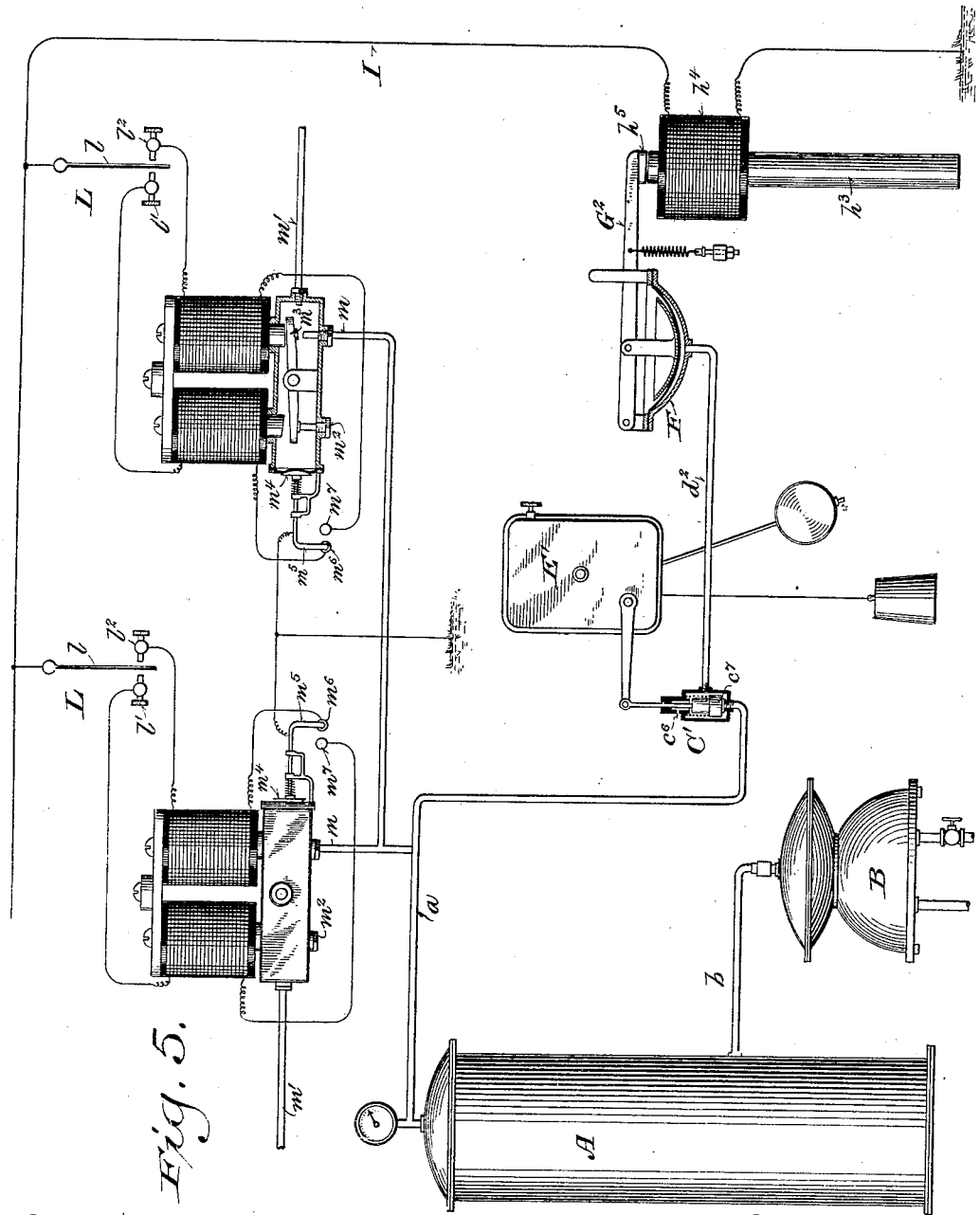

UNITED STATES PATENT OFFICE.

CHARLES L. FORTIER, OF MILWAUKEE, WISCONSIN, ASSIGNOR TO THE JOHNSON ELECTRIC SERVICE COMPANY, OF SAME PLACE.

AUTOMATIC TEMPERATURE-REGULATING APPARATUS.

SPECIFICATION forming part of Letters Patent No. 551,951, dated December 24, 1895.

Application filed May 8, 1893. Serial No. 473,397. (No model.)

*To all whom it may concern:*

Be it known that I, CHARLES L. FORTIER, of Milwaukee, in the county of Milwaukee and State of Wisconsin, have invented certain new and useful Improvements in Automatic Temperature-Regulating Apparatus; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main objects of my invention are to insure the effective operation of the apparatus, to reduce the care, labor and cost of keeping the same in proper working condition, to effect a saving in energy, and to admit of the employment of comparatively weak currents by separating the work into divisions and automatically switching the current at suitable intervals to such divisions, one after another.

It consists essentially of the combination, with means for operating a heat-controlling valve or damper including an electromagnet and electric generator connected by a circuit provided with a thermostat, of a motor arranged to operate said generator intermittently and automatically at stated intervals.

It consists also of the combination, with means of operating heat-regulating valves or dampers including an electric generator, thermostats and electromagnets in circuit, of an automatic switch arranged to connect the several thermostats or groups of thermostats at stated intervals with the generator; and it consists further of certain novel features in the construction and arrangement of component parts of the apparatus hereinafter particularly described and pointed out in the claims.

In the systems of temperature regulation now in use, particularly in private dwellings and schools, primary open-circuit batteries are employed for the operation of the electric valves. These batteries from various causes frequently fail and must be renewed. They must also be charged in the fall and emptied in the spring, thereby causing more or less expense to users or to the company installing the apparatus, and the larger the business and the more batteries there are to maintain the greater will be the trouble and expense. On the other hand the employment of a constantly-running motor and generator to produce the current required to operate the apparatus would be wasteful of energy and needlessly expensive; but by the employment of the means hereinafter described for producing a current of the required strength at such intervals only as are required I am enabled to efficiently and economically avoid the difficulties above stated.

In the accompanying drawings like letters designate the same parts in the several figures.

Figure 1 is a diagram of a heating system to which my invention is applied. Fig. 2 is an enlarged view, partly in elevation and partly in section, of a portion of the apparatus shown in Fig. 1. Fig. 3 is a vertical longitudinal section, on a still larger scale of the valve E and its connections. Fig. 4 is a view similar to Fig. 2 of a modification of the apparatus, and Fig. 5 is a similar view illustrating still another modification.

Referring to Fig. 2 in connection with Fig. 1, A represents an air-tank or fluid-pressure reservoir, and B a pump or compressor connected by a pipe $b$ therewith. C is a three-way valve connected by a pipe $a$ with the reservoir A, and provided with an exhaust pipe or opening $c$ and a double bell-crank lever $c'$ formed or provided on opposite sides of its fulcrum with valves, which are arranged to alternately open and close the inlet and exhaust openings at the inner ends of the pipes $a$ and $c$. It is also provided with an arm $c^2$ mounted upon a rock-shaft $c^3$ and connected by a spring $c^4$ with the intermediate arm of said lever $c'$. To the rock-shaft $c^3$ outside of the valve-case is fixed a forked arm $c^5$.

D is a closed fluid-reservoir connected by a pipe $d$ with the valve C and by a pipe $d'$ with an expansion-chamber F. The pipe $d'$ is provided with a check-valve E opening toward the expansion-chamber, and with a by-passage $e$ around said check-valve, having a regulating-cock $e'$, as shown in Fig. 3, by which the return flow of fluid from the expansion-chamber to the reservoir D may be regulated as desired.

G is a lever fulcrumed at $g$ to the expansion-chamber, or any suitable support, and connected at $f$ with the diaphragm or movable part of the expansion-chamber. One arm of said lever engages with the forked arm $c^5$ of the valve C, and the other arm is provided with a weight $g'$ adjustably attached thereto and with a rack-bar $g^2$.

H is a magneto-electric machine, one terminal of which is connected by a conductor I with the movable part $k$ of a switch K, and the other terminal of which has a ground connection. The rack-bar $g^2$ engages with a gear $h$, loosely mounted upon and connected by a pawl $h^6$ and ratchet-wheel $h^7$ with the shaft of a gear $h'$ meshing with a pinion $h^2$ on the armature-shaft of the generator H. The movable part or contact-arm $k$ of the switch is attached to and moves with a rotary ratchet-wheel $k'$, and is arranged to engage in rotation with a series of fixed contacts $k^2 k^2$. The bar $g^3$, pivoted to the arm of lever G, engaging the forked arm $c^5$ and provided on a laterally-projecting arm with an adjustable weight $g^4$ is arranged to rotate the ratchet-wheel $k'$ in the direction indicated by the arrow by intervals corresponding with the distances between the fixed contacts $k^2 k^2$. A pawl $k^3$ engaging with said ratchet-wheel prevents its backward rotation.

With a generator arranged to yield a constant or unremitting current, the switch K would effect a saving in electrical energy by cutting out of circuit, except for brief intervals, any thermostat or branch which might be permanently closed by reason of improper adjustment or otherwise.

The fixed contacts $k^2 k^2$ are connected by wires $i i$ with the movable parts $l l$ of thermostats L L or groups of thermostats connected in multiple by said wires. The fixed contacts $l'$ and $l^2$ of each thermostat are connected with an electric valve M, which for the purpose of sensitiveness is preferably constructed on the polarized plan. It may be made like or similar to those shown in United States Letters Patent No. 479,795, granted to me August 2, 1892, in which two terminals of the coils of the differentially-wound electromagnet are connected with opposite contacts of the thermostat, and the other two terminals have a ground connection. The valve-chamber is connected by a pipe $m$ with the fluid-pressure reservoir A and by a pipe $m'$ with the expansion-chamber of a valve, damper, or other heat-controlling device N. It is also provided with an exhaust pipe or opening $m^2$ and a pivoted armature $m^3$, which is arranged to alternately open and close the openings at the inner ends of the supply and exhaust pipes $m m^2$. As many valves M M may be placed in each of the branches $i i$ as the electric generator H will efficiently operate at the same time. The check-valve E and by-passage $e$, with its regulating-cock $e'$, constitute a chronometer or time-measuring device by which the movable part of the expansion-chamber F, constituting the motor, may be caused to operate at the desired intervals.

The intermittent operation of the motor effects a great saving in power and in the consequent cost of operating the apparatus.

My improved apparatus operates as follows: The reservoir A being kept constantly supplied with a suitable medium, such as air, under the required pressure produced by the compressor or pump B, and assuming the parts of the valve C to be in the positions shown, pressure will be communicated to the medium, preferably a liquid, contained in the reservoir D, whence it will be forced through the pipe $d'$ and check-valve E into the expansion-chamber of the motor F. The lever G will thereby be tilted on its fulcrum $g$, swinging the forked arm $c^5$ downwardly, thereby shifting the lever $c'$, closing the inlet and opening the outlet of said valve, and simultaneously, through the rack-bar $g^2$ and the connections hereinbefore described, producing a number of turns of the armature of the generator H. An electric current will thus be produced, providing an electric connection is made with any of the valves M through any of the thermostats L connected with a contact $k^2$, with which the movable arm $k$ of the switch is in engagement. When the inlet-opening of valve C is closed and its exhaust-opening is opened, in the manner above stated, the actuating medium by which the motor was operated will be allowed to escape from the expansion-chamber through the by-passage $e$ at a rate determined by the degree of opening of the regulating-cock $e'$. As the diaphragm or movable part of the motor recedes the weight $g'$ will return the lever G to the position shown and thereby shift the lever $c'$ to its original position, opening the inlet and closing the exhaust of valve C. The descent or return movement of the rack-bar $g^2$ is permitted without operating the armature of the generator in the reverse direction by the ratchet connection of the gear $h$ with the armature-shaft. The return movement of the rod or bar $g^3$, which is held in engagement with the ratchet-wheel $k'$ by the weight $g^4$ or any other suitable device, turns said ratchet-wheel an interval, moving the arm $k$ into engagement with the next fixed contact $k^2$ in advance. The parts of valve C being restored to their original position causes the operation of the apparatus to be repeated as above explained, and the current momentarily generated to be carried to another thermostat or group of thermostats. In this manner the several branches $i i$ and their connections are successively brought into circuit with the generator and supplied with current from it, at each complete vibration of the lever G. Each section of the apparatus will be brought into circuit at each complete revolution of the arm $k$, the time of which may be regulated as hereinbefore mentioned, by means of the cock $e'$, and every valve through which the circuit is closed by means of its thermostat in that section will be shifted if the condition of temperature is such as to require it. Otherwise it will remain quiescent.

Referring to Fig. 4, the reservoir A is connected by the pipe $a$ with the chamber of a three-way valve $C'$, which in turn is connected by a pipe $d^2$ with the expansion-chamber F. It is provided with an exhaust-opening $c^6$ opposite the opening thereinto of pipe $a$, and with a valve $c^7$, the stem of which extends outside of the case and is connected with a vibrating arm of a chronometer $E'$, comprising a train of gears (not shown) actuated by a weight or its equivalent, a spring, and arranged to shift the valve $c^7$ and thereby alternately open and close the inlet and exhaust openings of said valve-case. The lever $G'$, fulcrumed as in the other case at $g$ to the expansion-chamber or any suitable support, and provided at one end with an adjustable weight $g'$ and a rack-bar $g^2$ pivoted thereto, has a connection $g^5$ at its opposite end with the clock-train, whereby the vibration of said lever automatically winds said train. $H'$ is a small dynamo-electric generator, one terminal of which has a ground connection and the other terminal is connected by the conductor I with the movable part $l$ of one or more thermostats L, which are arranged in multiple arc. O is an electric controlling-valve comprising two electromagnets $o$ and $o'$, two of the opposite terminals of which are connected with the fixed contacts $l'$ and $l^2$ of a thermostat, and the other terminals of which are connected with contacts $o^2$ and $o^3$ of a circuit-breaker. The valve-case, which may be conveniently made in circular form, has an inlet connection $o^4$ communicating through a pipe $a'$ with the reservoir A, an exhaust connection or opening $o^5$, and a pipe connection $o^6$ leading therefrom to the expansion-chamber of a valve, damper or other heat-regulating device. (Not shown.) $o^7$ is a vibrating arm pivoted inside of the case and formed or provided with valves arranged to alternately open and close the inlet and exhaust connections $o^4$ and $o^5$. $p$ is the armature pivoted centrally within the valve-case in the field of the two magnets which are not diametrically opposite. It has an arm $p'$ connected with the valve-arm $o^7$ and with the opposite side of the case by a spring $p^2$, which when drawn to either side past the center on which the armature turns, holds the vibrating valve-arm $o^7$ in contact with either the inlet or the exhaust connection. To the armature are attached curved contact-springs $p^3$ and $p^4$, arranged to engage one at a time with the contacts $o^2$ and $o^3$ respectively. The operation of this modification of the apparatus is similar to that of the apparatus shown in Figs. 1 and 2, and need not be explained in detail, as it will be sufficiently understood by those skilled in the art to which my invention pertains.

The generator $H'$ is made of sufficient capacity to operate all the valves which may be connected therewith at any one time, and is arranged to produce a current of sufficient duration to operate a valve like that shown in Fig. 4, which responds less promptly to the current than one of the polarized type like that shown in Fig. 1.

Referring to Fig. 5, the chronometer $E'$ is like that shown in Fig. 4, except that it has no automatic winding connection with the motor and therefore requires to be manually wound at stated intervals. The generator is of the magneto-electric type, and consists of a permanent magnet $h^3$ surrounded by a coil $h^4$, and of an armature $h^5$, which is attached to the lever $G^2$ and is arranged to be moved thereby in the field of said permanent magnet $h^3$. One terminal of said coil is connected with the ground and the other by the conductor I with the movable parts of the thermostats, as in the other forms of the apparatus hereinbefore described. In connection with this form of apparatus, I have shown a modification of the electric valve illustrated in Fig. 2. The valve-chamber is provided in one side with a flexible diaphragm against which a plate $m^4$ is held by a spring. With this plate is connected an arm $m^5$, arranged to be moved by said diaphragm and spring into engagement with fixed contacts $m^6$ and $m^7$, which are connected with the terminals of the differentially-wound magnet-coils. The arm $m^5$ has a ground connection. By this means the circuit is opened through one or the other of said coils according to the position of the valve, and when the condition of the temperature is such as not to require a change in its position it will not take any energy from the motor, the entire energy of which is thus reserved for the operation of such valves as it is necessary by reason of variation in temperature to shift. The electric generator is made of sufficient capacity to operate all the valves which a variation in temperature may make it necessary to operate at one time, but where a considerable number of valves are included in a single plant they may be arranged in groups or sections and connected by means of an automatic switch, as shown in Figs. 1 and 2, in rotation with the generator.

The form of apparatus last described being similar to that shown in Figs. 1 and 2, its operation will be readily understood by those skilled in the art to which it pertains without further explanation.

By the term "motor" as employed herein I intend to designate the expansion-chamber F, including the movable part thereof, and the lever G, $G'$ or $G^2$, as shown in either Figs. 2, 4 or 5, or any suitable actuating device for operating the generator, and by the term "chronometer" I intend to designate any suitable time-measuring device for causing an intermittent operation of the motor, such as the check-valve E and by-passage $e$ (shown in Fig. 2) or the clock-train E'. (Shown in Fig. 4 or Fig. 5.)

I have shown and described for the purpose of actuating the heat regulating or controlling valves or dampers well-known fluid-pressure devices controlled in operation by electro-magnets in circuit with thermostats or circuit-controlling devices constructed and arranged to be operated by changes of temperature; but I do not wish to be understood as limiting myself to the use of such fluid-pressure devices or of any particular mechanism or actuating medium for this purpose.

Various modifications of details in the construction and arrangement of the component parts of the apparatus other than those specifically shown and described may be made within the intended scope of my invention.

I claim—

1. In temperature regulating apparatus, the combination with a heat controlling valve or damper and means for operating the same comprising an electric circuit including an electro magnet, thermostat and electric generator, of a motor arranged to operate said generator intermittently and automatically at frequent intervals, whereby current is produced only when needed and power is economized, substantially as and for the purposes set forth.

2. In temperature regulating apparatus the combination with a heat controlling valve or damper and means for operating the same, including an electro-magnet, and a thermostat having contacts in circuit with the windings of said magnet, of an electric generator in circuit with said thermostat, and a motor connected with and arranged to automatically stop and start said generator intermittingly at frequent intervals, substantially as and for the purposes set forth.

3. In temperature regulating apparatus the combination with a heat regulating valve or damper and means for operating the same, including an electro-magnet, and a thermostat having contacts in circuit with the windings of said magnet, of an electric generator in circuit with said thermostat, a motor connected with said generator, a fluid pressure reservoir connected with the motor, and means for automatically opening and closing communication between said reservoir and motor and producing an intermittent operation of the motor, substantially as and for the purposes set forth.

4. In temperature regulating apparatus the combination with heat regulating valves or dampers, and means for operating the same, including electro-magnets, and two or more thermostats or groups of thermostats each having contacts in circuit with the windings of one of said magnets, of an electric generator, and an automatic switch between said thermostat and generator having contacts each electrically connected with a thermostat or group of thermostats, and arranged to connect said generator at intervals with the several thermostats or groups of thermostats, substantially as and for the purposes set forth.

5. In temperature regulating apparatus the combination with heat regulating valves or dampers and means for operating the same, including polarized electro-magnets, and two or more thermostats or groups of thermostats each having contacts in circuit with the windings of one of said magnets, of an electric generator, and an automatic switch having contacts each connected with a thermostat or group of thermostats, and arranged to connect the generator at intervals therewith, substantially as and for the purposes set forth.

6. In temperature regulating apparatus the combination with heat regulating valves or dampers and means for operating the same, including electro-magnets, and two or more thermostats or groups of thermostats each having contacts in circuit with the windings of one of said magnets, of an electric generator having circuit connections with said thermostats, an automatic switch arranged to connect said thermostats or groups of thermostats in rotation with said generator, and an intermittingly operating motor connected with said generator and switch, substantially as and for the purposes set forth.

7. In temperature regulating apparatus the combination with a main heat controlling valve or damper and means for operating the same, including an electro-magnetic controlling valve, and a thermostat in circuit with said electro-magnetic valve, of an electric generator in circuit with said thermostat, a motor connected with said generator and comprising an expansion chamber, a fluid pressure reservoir communicating with said expansion chamber, a valve controlling communication between said reservoir and expansion chamber and the admission and release of the motive fluid to and from said chamber, and connected with and arranged to be operated by said motor, and an adjustable exhaust opening or passage by which the discharge of the actuating medium from the expansion chamber of the motor is controlled so as to produce a retarded or intermitting operation of the motor, substantially as and for the purpose set forth.

8. In temperature regulating apparatus the combination with a heat regulating valve or damper and a fluid pressure motor therefor of a fluid pressure reservoir, a pump or compressor connected therewith, an electro-magnetic valve for controlling the flow of the motive fluid from said reservoir to said motor, an electric generator connected with said electro-magnetic valve, a thermostat controlling the connection between said generator and electro-magnetic valve, a fluid pressure motor connected with said generator and having an expansion chamber connected with said reservoir, and a valve controlling communication between said reservoir and expansion chamber and the admission and release of the motive fluid to and from said chamber and connected with and arranged to be operated by said motor, the connection between said valve and expansion chamber being provided with a check valve opening toward the latter, and with a contracted return passage or aperture whereby the discharge of the actuating medium from said expansion chamber is retarded, substantially as and for the purposes set forth.

9. In temperature regulating apparatus the combination with a main heat regulating valve or damper and means for operating the same, including an electro-magnetic controlling valve, and a thermostat in circuit with said electro-magnetic valve, of an electric generator in circuit with said thermostat, a motor connected with said generator and comprising an expansion chamber, a fluid pressure reservoir communicating with said chamber, a three-way valve controlling communication between said reservoir and expansion chamber and provided with an exhaust opening or connection, said valve being connected with and arranged to be operated by said motor, and a connection between said valve and expansion chamber provided with a check valve opening toward said chamber, and with a reduced or contracted return passage having a regulating cock whereby the discharge of the actuating medium from said expansion chamber and the operation of the motor may be retarded more or less as desired, substantially as and for the purposes set forth.

10. In temperature regulating apparatus the combination with a main heat controlling valve or damper and means for operating the same, including an electro-magnetic controlling valve, and a thermostat in circuit with said electro-magnetic valve, of an electric generator in circuit with said thermostat, a motor connected with and arranged to operate said generator, and comprising an expansion chamber, a compressed air reservoir, a three-way valve controlling communication between said reservoir and expansion chamber and having an exhaust opening or connection, said valve being connected with and arranged to be operated by said motor, and a closed reservoir or chamber in the connection between said valve and expansion chamber, the communication between said last mentioned reservoir and the expansion chamber being provided with a check valve opening toward the latter, and with a return passage having a regulating cock by which the discharge of the actuating medium from said expansion chamber may be retarded more or less, substantially as and for the purposes set forth.

11. In temperature regulating apparatus the combination with a heat regulating valve or damper a fluid pressure motor connected therewith, a fluid pressure reservoir connected with said motor, and an electrically actuated valve controlling the fluid pressure connection of said motor and the admission and release of the motive fluid to and from said motor, of an electric generator having an electric connection with said valve, and an intermittingly operating fluid pressure motor connected with said generator and with said reservoir, substantially as and for the purposes set forth.

12. In temperature regulating apparatus the combination with a heat regulating valve or damper, of a fluid pressure controlling valve provided with a differentially wound polarized magnet arranged to operate the same, the thermostat having contacts connected with the windings of said magnet, an electric generator connected with said thermostat, and an intermittingly operating motor connected with said generator, substantially as and for the purposes set forth.

In testimony that I claim the foregoing as my own I affix my signature in presence of two witnesses.

CHARLES L. FORTIER.

Witnesses:
  CHAS. L. GOSS,
  A. W. EMERY.